US012766465B2

(12) United States Patent
Hana et al.

(10) Patent No.: US 12,766,465 B2
(45) Date of Patent: Oct. 20, 2026

(54) FILTER-BOX AND A RETRIEVABLE SUBSEA FILTER MODULE WITH A FILTER-BOX

(71) Applicant: WATERISE AS, Oslo (NO)

(72) Inventors: Morten Hana, Oslo (NO); Tom Gunnar Omberg, Oslo (NO); Jo Jernsletten, Haslum (NO); Beatriz Garcia Fernandez, Enschede (NL)

(73) Assignee: WATERISE AS, Oslo (NO)

(*) Notice: Subject to any disclaimer, the term of this patent is extended or adjusted under 35 U.S.C. 154(b) by 429 days.

(21) Appl. No.: 18/556,503

(22) PCT Filed: Apr. 25, 2022

(86) PCT No.: PCT/NO2022/050091
§ 371 (c)(1),
(2) Date: Oct. 20, 2023

(87) PCT Pub. No.: WO2022/225404
PCT Pub. Date: Oct. 27, 2022

(65) Prior Publication Data

US 2024/0189773 A1 Jun. 13, 2024

(30) Foreign Application Priority Data

Apr. 23, 2021 (NO) .................................... 20214096

(51) Int. Cl.
*B01D 61/02* (2006.01)
*B01D 61/08* (2006.01)
(Continued)

(52) U.S. Cl.
CPC ........... *B01D 61/025* (2013.01); *B01D 61/08* (2013.01); *C02F 1/441* (2013.01);
(Continued)

(58) Field of Classification Search
None
See application file for complete search history.

(56) References Cited

U.S. PATENT DOCUMENTS 4,744,900 A * 5/1988 Bratt ...................... B01D 61/10 210/321.78
5,194,149 A * 3/1993 Selbie .................. B01D 63/046 210/232

(Continued)

*Primary Examiner* — Krishnan S Menon
(74) *Attorney, Agent, or Firm* — 500Law Ted Whitlock Registered Patent Attorney PA

(57) ABSTRACT

The present invention concerns a subsea filter-box with a plurality of pressure-vessels 1 forming at least one group of longitudinal pressure-vessels. A first support plate 7 and a second support plate 8 includes a plurality of fixing geometries 20, each supporting pressure-vessel end sections 17, 6. Each of the plurality of pressure-vessels extends between a fixture on the first support plate and a fixture on the second support plate. Each group of pressure-vessels includes at least one entry pressure-vessel one end pressure-vessel 14, adjoining and in liquid connection with an intermediate pressure-vessel 16; and a filter-box frame, clamping the first support plate 7 and the second support plate 8 to the plurality of pressure-vessels. A filter module with at least one filter-box is also disclosed.

11 Claims, 11 Drawing Sheets

(51) Int. Cl.
*C02F 1/44* (2023.01)
*C02F 103/08* (2006.01)

(52) U.S. Cl.
CPC ...... *B01D 2313/21* (2013.01); *B01D 2313/24* (2013.01); *B01D 2313/54* (2013.01); *B01D 2315/06* (2013.01); *B01D 2317/04* (2013.01); *C02F 2103/08* (2013.01); *C02F 2201/007* (2013.01); *C02F 2301/066* (2013.01)

(56) References Cited

U.S. PATENT DOCUMENTS

| | | | | |
|---|---|---|---|---|
| 5,405,528 A * | 4/1995 | Selbie | B01D 63/046 | 210/232 |
| 12,390,766 B2 * | 8/2025 | Webley | B01D 61/002 | |
| 2012/0074053 A1 * | 3/2012 | Collignon | B01D 63/046 | 210/209 |
| 2018/0021731 A1 * | 1/2018 | Knappe | B01D 65/00 | 210/321.6 |

* cited by examiner

FILTER-BOX AND A RETRIEVABLE SUBSEA FILTER MODULE WITH A FILTER-BOX

BACKGROUND OF THE INVENTION

The present invention relates to a subsea filter-box and a retrievable subsea filter module with such a subsea filter-box. The subsea filter module is particularly adapted to be used with subsea templates with dedicated zones for such subsea filter modules.

The subsea filter-box and the retrievable subsea filter module is particularly intended for use in connection with desalination using RO-membranes and hydrostatic pressure to fully or partly pressure seawater through the RO-membranes.

Using pressure-vessels with membranes subsea also reduces the required pressure rating of the pressure-vessel as pressure difference between the inside and outside of the pressure-vessel is reduced.

In filtration, space can be a problematic, and it is a purpose of the present invention to provide a more compact stacking of pressure vessels with membranes than previous solutions. Compact stacking is particularly useful when using pressure vessels with membranes in modules subsea, as space may be limited and high space requirements drives costs both in production and installation as typically large support vessels will be required for launching or retrieving large templates and modules.

Reverse osmosis (RO) membranes can be placed in seawater at a water depth providing to a hydrostatic pressure greater than the osmotic pressure ($\pi$). A hydrostatic pressure greater than $\pi$ can be utilized in a desalination process to push water molecules through RO-membranes without requiring additional pressure. Subsea desalination is favourable as the pump providing the flow through the RO membranes can be located downstream of the RO membranes, thus only pumping the flow of desalinated water rather than the full flow of seawater.

Typical pressure-vessels for RO-membranes have an outlet for permeate at the centre of one of the short sides opposite the inlet. Such a location demands access to the end of the pressure-vessel and this access put particular requirements to the stacking of pressure-vessels. It is one of the purposes of the present invention to omit this limitation to provide greater flexibility in pressure-vessel stacking. Furthermore, the subsea filter-box of the invention provides a compact structure that is suited for use in a subsea module and that can for basis for a number of pressure-vessel and subsea filter-box configurations.

SUMMARY OF THE INVENTION

The present invention concerns a subsea filter-box with a plurality of longitudinal pressure-vessels forming at least one group of longitudinal pressure-vessels. Each pressure vessel includes a membrane, a first end section and a second end section. Each first end section includes a first side face and a first end section end face. Each second end section includes a second side face and a second end section end face. The first end section end face faces away from the second end section end face.

At least one feed liquid inlet is located on the first end section side face, At least one retentate outlet and at least one permeate/filtrate outlet is located on the second end section side face. The subsea filter-box comprises a first support plate with a plurality of fixing geometries, each supporting a first end section, a second support plate with a plurality of fixing geometries, each supporting a second end section, whereby each of the plurality of pressure-vessels extends between a fixing geometry on the first support plate and a fixing geometry on the second support plate. The at least one group of pressure-vessels includes at least one entry pressure-vessel with at least one liquid outlet on the first end section side face, at least one intermediate pressure-vessel with at least one liquid outlet on the first end section side face, at least one permeate inlet on the second end section side face, and at least one retentate inlet on the second end section side face, adjoining and in liquid connection with the entry pressure-vessel. One end pressure-vessel adjoins and is in liquid connection with an intermediate pressure-vessel. A clamp structure, clamps the first support plate and the second support plate to the plurality of pressure-vessels.

The entry pressure-vessel may be a 5-port pressure-vessel, the end pressure-vessel may be a 4-port pressure-vessel and the intermediate pressure-vessel may be a 6-port pressure-vessel.

The entry pressure-vessel may furthermore include a permeate/filtrate outlet on the second end section side face, and the end pressure-vessel may then include a retentate inlet on the second end section side face.

The feed liquid inlet, the retentate outlet, and the permeate/filtrate outlet of a pressure vessel may be fixed to the feed liquid outlet, the retentate inlet and the permeate inlet respectively of a neighbouring pressure vessel with releasable liquid couplings.

The releasable liquid couplings may provide mechanical joints providing a stiff connection, mechanically fixing the pressure-vessels in a group of longitudinal pressure-vessels to each other.

Each pressure vessel may include a permeate end cap, sealing a permeate side of the pressure-vessel. The permeate end cap may include a permeate channel fixed to a threaded portion of a permeate/filtrate outlet tube of the pressure-vessel with an end cap attachment bracket formed as a tube with internal threads threaded onto the permeate/filtrate outlet tube, and with ports on the side to allow the permeate to flow out of the tube, holding the end cap to the permeate/filtrate outlet tube.

The first end section end face may be parallel to the second end section end face.

The membrane may be a Reverse Osmosis (RO) membrane and the subsea filter-box may be adapted to be used for subsea desalination whereby the feed liquid is seawater, the retentate is brine and the permeate is freshwater.

Furthermore, the invention concerns a retrievable subsea filter module with at least one filter-box as described above, including a plurality of groups of longitudinal pressure-vessels further including a feed liquid inlet header in liquid connection with each feed liquid inlet on each entry pressure vessel. A retentate header is in liquid connection with each retentate outlet on one of each entry pressure vessel or each end pressure-vessel. A permeate header is in liquid connection with each permeate/filtrate outlet on one of each entry pressure vessel or each end pressure-vessel.

The filter module may include two filter-boxes wherein a first of the two filter-boxes is located on top of a second of the two filter-boxes, whereby a longitudinal centreline of each pressure vessel of the first filter-box is coinciding with a longitudinal centreline of a pressure vessel of the second filter-box.

The subsea filter module may further include a subsea desalination template with a retrievable subsea filter module zone, a retentate outlet pipe extending from the desalination module, a permeate and service line extending from the desalination template and to a permeate receiving facility.

Furthermore, the invention relates to a longitudinal pressure-vessel with a membrane. A first end section includes a first side face and a first end section end face. A second end section includes a second side face and a second end section end face. The first end section end face faces away from the second end section end face. At least one feed liquid inlet is located on the first end section side face. At least one retentate outlet and at least one permeate/filtrate outlet are located on the second end section side face. At least one of a feed liquid outlet is located on the first end section side face, a retentate inlet (33) is located on the second end section side face, and a permeate inlet is located on the second end section side face.

The membrane may be an RO-membrane and the pressure-vessel may be a desalination pressure vessel.

BRIEF DESCRIPTION OF THE DRAWINGS

Short description of the enclosed drawings.

DETAILED DESCRIPTION OF THE INVENTION

Detailed description of embodiments of the invention by reference to the enclosed figs.

Figure 1:
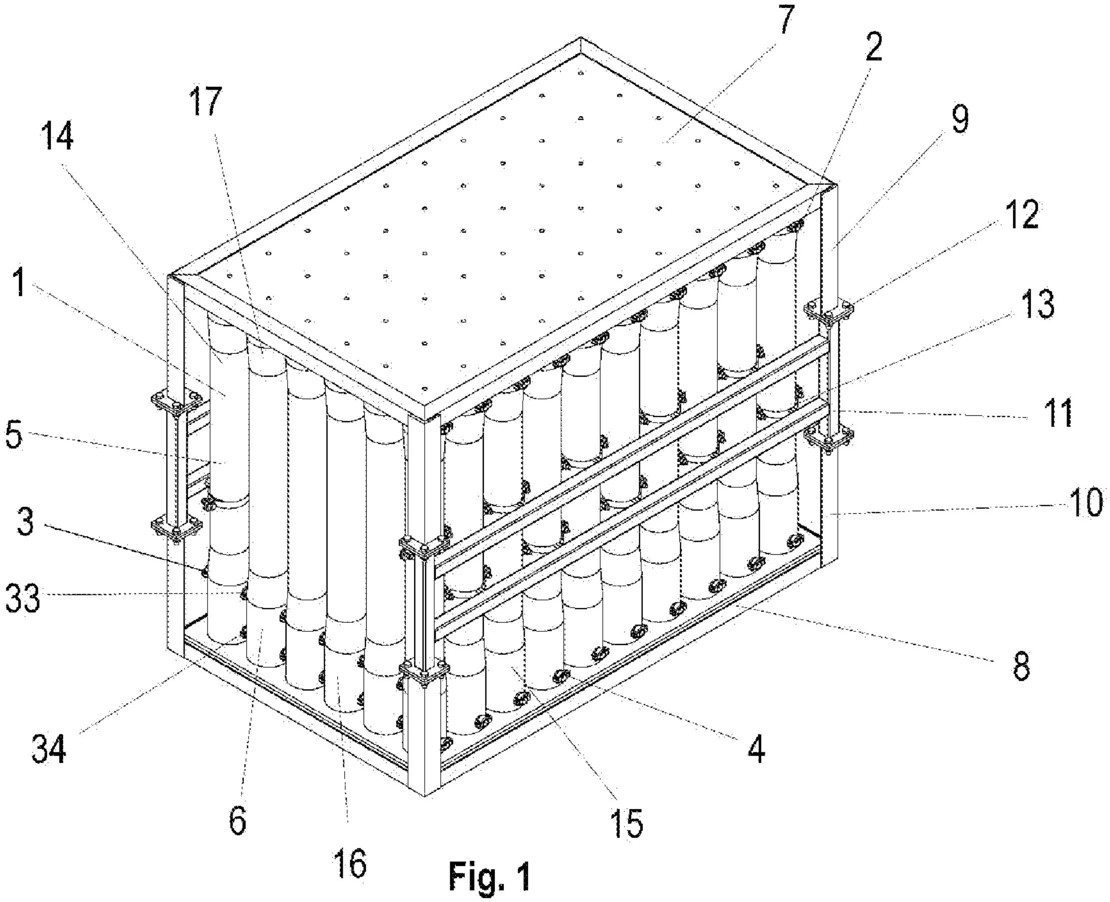
FIG. 1 is a perspective view of a filter-box according to the invention.

FIG. 1 is a perspective view of a filter-box according to the invention. The filter-box includes a number of pressure-vessels 1. The pressure-vessels 1 are shown in 6 lines, each line with ten pressure-vessels 1 to a total of 60 pressure-vessels 1, producing ten rows of six pressure-vessels 1 each. Each pressure-vessel includes a liquid inlet 2 in a pressure-vessel first section or pressure-vessel top section 17, and a retentate outlet 3 and a permeate/filtrate outlet 4 in a pressure-vessel second section/bottom section 6. A pressure-vessel centre section 5 connects the pressure-vessel bottom section 6 and the pressure-vessel top section 17 and holds RO-membranes.

Each of the 10 rows include four 6-port intermediate pressure-vessels 16, one 4-port end pressure-vessel 14 at a first-row end and one 5-port entry pressure-vessel 15 at a second row-end. The 5-port entry pressure-vessel 15 is providing the entry port for the liquid. The pressure-vessels 1 in one row are in liquid connection with each other to allow flow of liquid between the pressure-vessels 1 as well as joining the pressure-vessels mechanically, holding the pressure-vessels 1 in each row together. The feed liquid is typically seawater, permeate (desalinated water) and brine (high salt concentration seawater). In addition to the three ports listed above, does the 4-port pressure-vessel 14 include a retentate inlet.

In addition to the three ports listed above, does the 5-port pressure-vessel 15 include a liquid outlet and a permeate inlet.

In addition to the three ports listed above, does the 6-port pressure-vessel 16 include a retentate inlet, a liquid outlet, and a permeate inlet.

The pressure-vessels 1 are held in place between a first support plate/top support plate 7 and a second support plate/a bottom support plate 8, both with a circular recess forming a fixing geometry for each pressure-vessel 1. The first support plate/top support plate 7 and the second support plate/a bottom support plate 8 are clamped together with a clamp a clamp structure. The clamp structure may include an upper frame portion 9 supporting the top support plate 7 and lower frame portion 10 supporting the bottom support plate 8. Each of the upper frame portion 9 and the lower frame portion 10 are connected to two centre frame portions 11 in four frame joints 12, also forming a part of the clamp structure, clamping the parts together. Pressure-vessel support clamps 13 hold the pressure-vessels in the outer lines (with the 4-port pressure-vessels 14 to one centre frame portion 11 and the 5-port pressure-vessels 15 to the other centre frame portion 11). The pressure-vessel support clamps 13 are typically clamps surrounding the pressure-vessels. Some of the pressure-vessels include a retentate inlet 33 and a permeate inlet 34 to communicate liquid between the pressure-vessels.

The embodiment presented in FIG. 1 will also be applicable for other systems such as sulphate removal where a feed flow entering the inlet 2 is filtered by any type of filter cartridges located inside the pressure vessels 1 to a filtrate flow at the outlet 4 and a retentate flow at outlet 3.

Figure 2:
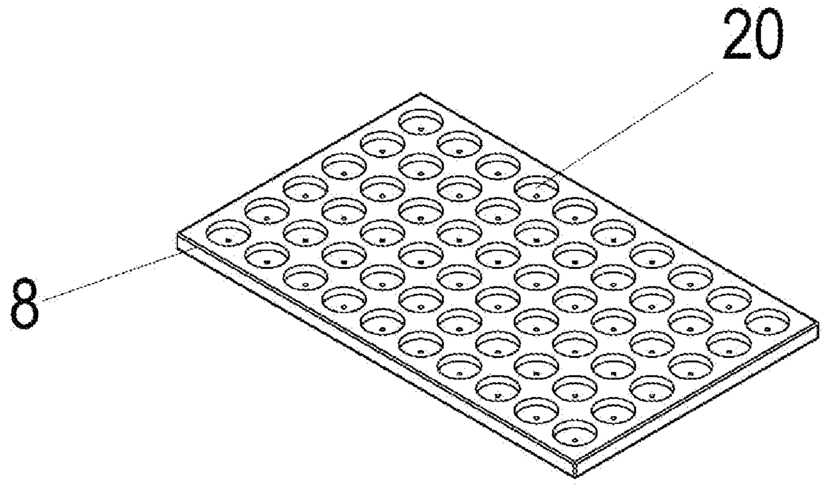
FIG. 2 is a perspective view of a bottom support plate.

FIG. 2 is a perspective view of a bottom support plate 8 that also is similar to the top support frame 7 shown in FIG. 1. The bottom support plate 8 includes one circular recess or fixing geometry 20 for each pressure-vessel the support plate is intended to hold, in this case 60 fixing geometries 20 in a pattern with six lines and ten rows of fixing geometries. The fixing geometries are in line with each other.

The fixing geometries 20 are geometries preventing sideways and longitudinal displacement of the pressure-vessels. The fixing geometries are adapted to the shape and size of the ends of the pressure-vessels.

Figure 3:
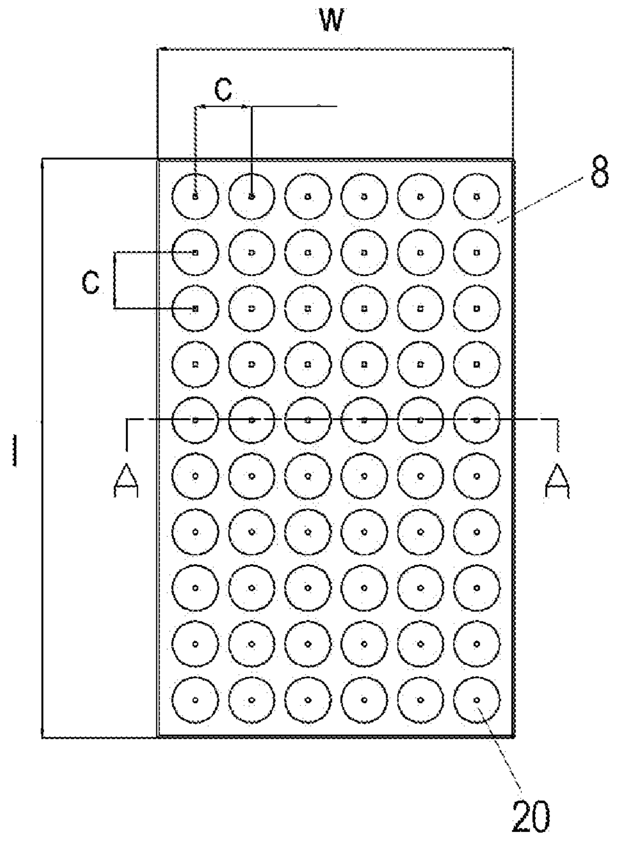
FIG. 3 is a top view of the bottom support plate as shown in FIG. 2.
Figure 4:
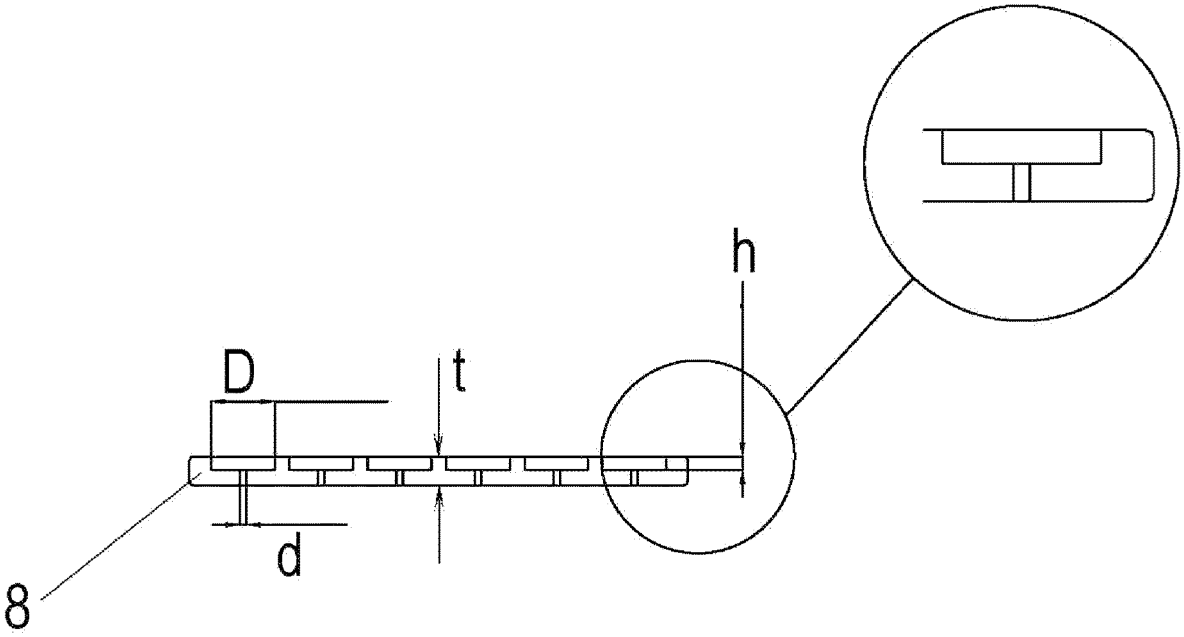
FIG. 4 is a cross section A-A as shown in FIG. 3 of the bottom support plate.

In the FIGS. 3 and 4 are approximate dimensions included to indicate an order of magnitude of the size of the support plates.

FIG. 3 is a top view of the bottom support plate 8 as shown in FIG. 2. A distance c between each of the fixing geometries 20 shaped as circular recesses is typically 36 cm. The width w of the plate is typically 230 cm and the length l of the plate is typically 370 cm.

FIG. 4 is a cross section A-A as shown in FIG. 3 of the bottom support plate 8 showing the diameter D of the fixing geometries 20 to be 30 cm and the diameter d of 3 cm of a bore through the support plate at the centre of each recess. The thickness t of the support plate is 13 cm and the depth h of each recess is 6 cm.

Figure 5:
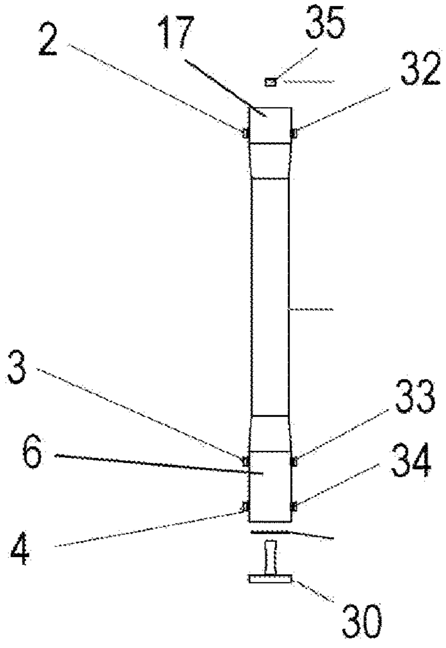
FIG. 5 is a side elevation of a pressure-vessel.

FIG. 5 is a side elevation of a pressure-vessel with a liquid inlet 2, a retentate outlet 3, a permeate/filtrate outlet 4, a feed liquid outlet 32, a retentate inlet 33, and a permeate inlet 34. A top plug 35 allows access to a liquid inlet chamber of the pressure-vessel. A permeate end cap 30 seals the permeate side of the pressure-vessel and includes a permeate channel. The pressure-vessel with includes the pressure-vessel first end section (top) 17 and the pressure-vessel second end section (bottom) 6.

Figure 6:
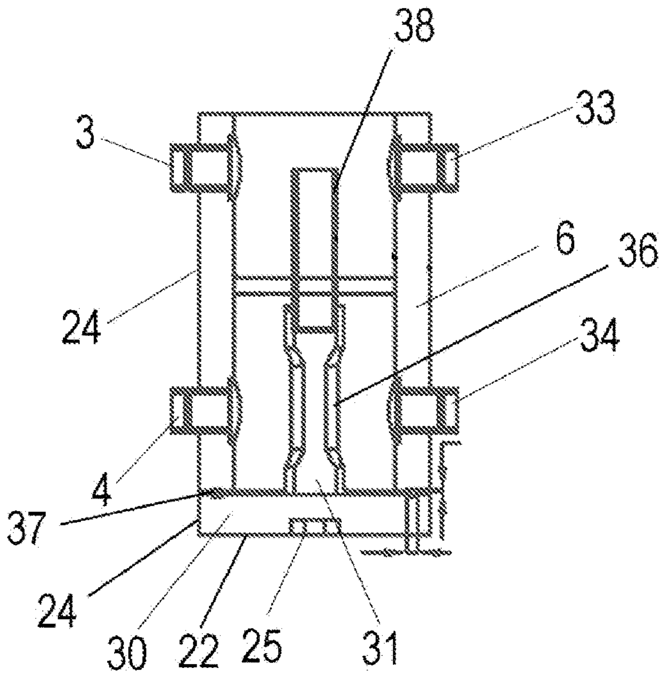
FIG. 6 is a cross-section of a pressure-vessel bottom section.

FIG. 6 is a cross-section of a pressure-vessel bottom section 6. The retentate outlet 3, a retentate inlet 33, a permeate/filtrate outlet 4 and a permeate inlet 34. The permeate end cap 30, sealing the permeate side of the pressure-vessel includes the permeate channel 31 extending as a perforated hollow channel from a base to guide the flow from the inlet and outlet. The permeate end cap 30 includes a second/bottom pressure-vessel end section end face 22 and a second/bottom pressure-vessel end section side face 24. The end section 30 is fixed to a threaded portion of a permeate/filtrate outlet tube 38 of the pressure-vessel with an end cap attachment bracket 36 formed as a tube with internal threads threaded onto the permeate/filtrate outlet tube 38, and with ports on the side to allow the permeate to flow out of the tube. Gaskets or seals 37 seals between the end section 30 and an end face of the pressure vessel. The end cap attachment bracket 36 holds the end cap 30 to the pressure vessel. The end cap 30 includes a tool attachment potion 25 such as a recess for receiving a hex key/Allen key or a Torx key.

Figure 7:
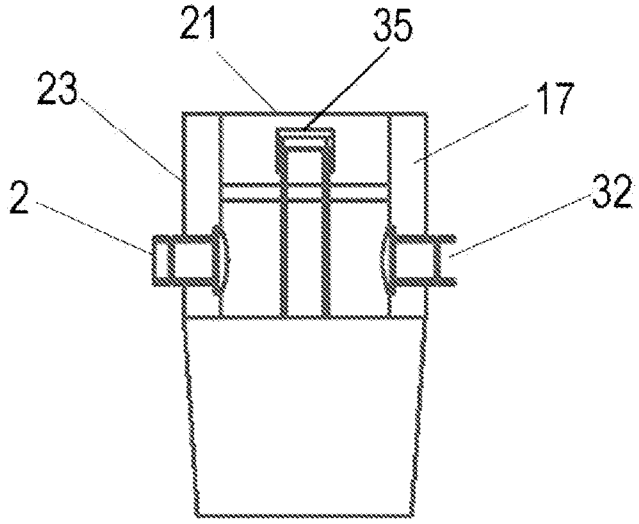
FIG. 7 is a cross-section of a pressure-vessel first section/top section.

FIG. 7 is a cross-section of a pressure-vessel first section/top section 17. The feed liquid inlet 2, a feed liquid outlet 32. The top plug 35 allows access to the feed liquid inlet chamber of the pressure-vessel. A first/top pressure-vessel end section end face 21 and a first/top pressure-vessel end section side face 23.

In the 4-port pressure-vessels 14 described in connection with FIG. 1 is the feed liquid outlet 32 and the permeate inlet 34 plugged or omitted.

In the 5-port pressure-vessels 15 described in connection with FIG. 1 is the retentate inlet 33 omitted or plugged.

Figure 8A:
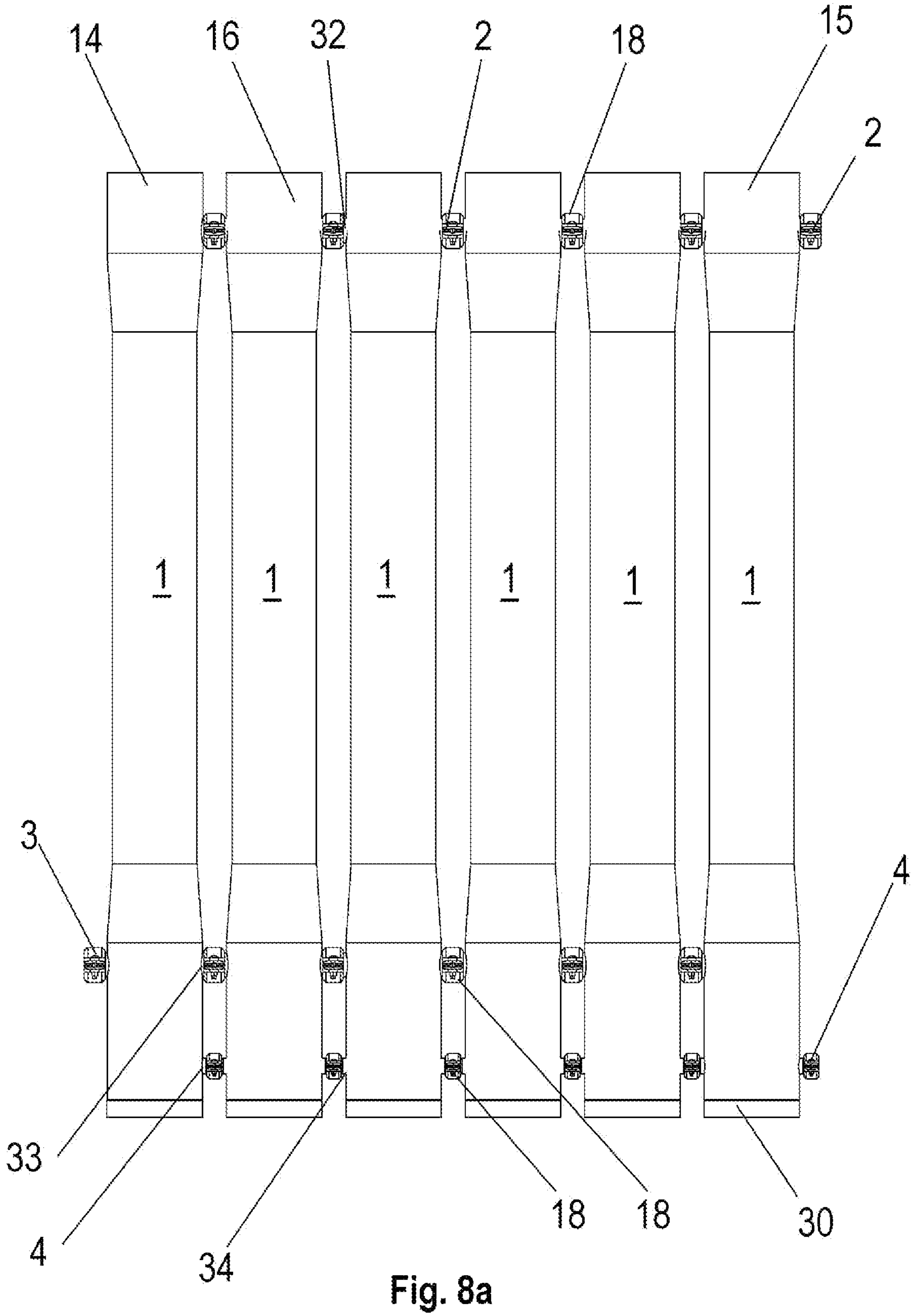
FIGS. 8*a*, 8*b* and 8*c* are schematic representations of different embodiments of rows of six pressure-vessels.
Figure 8B:
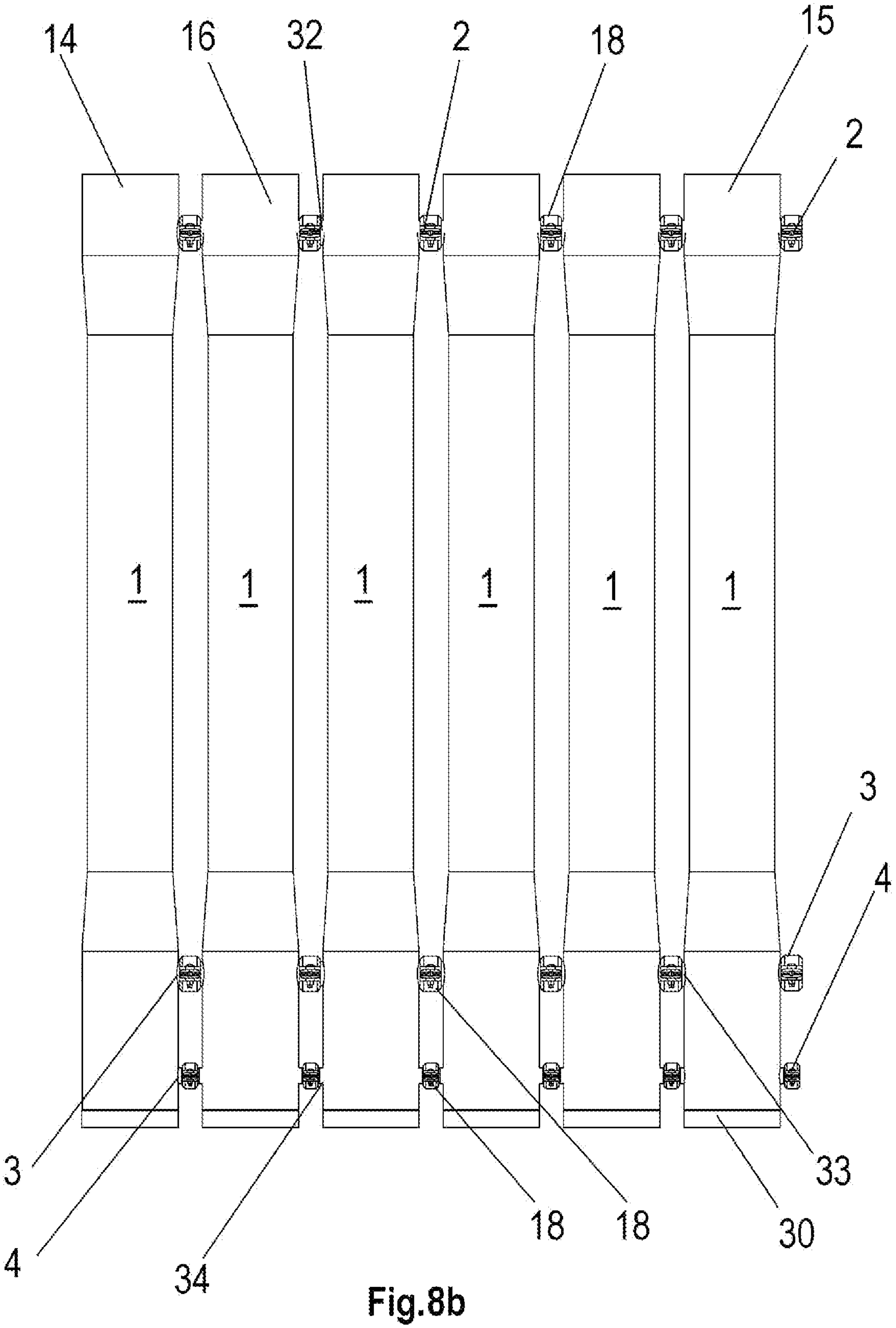
Figure 8C:
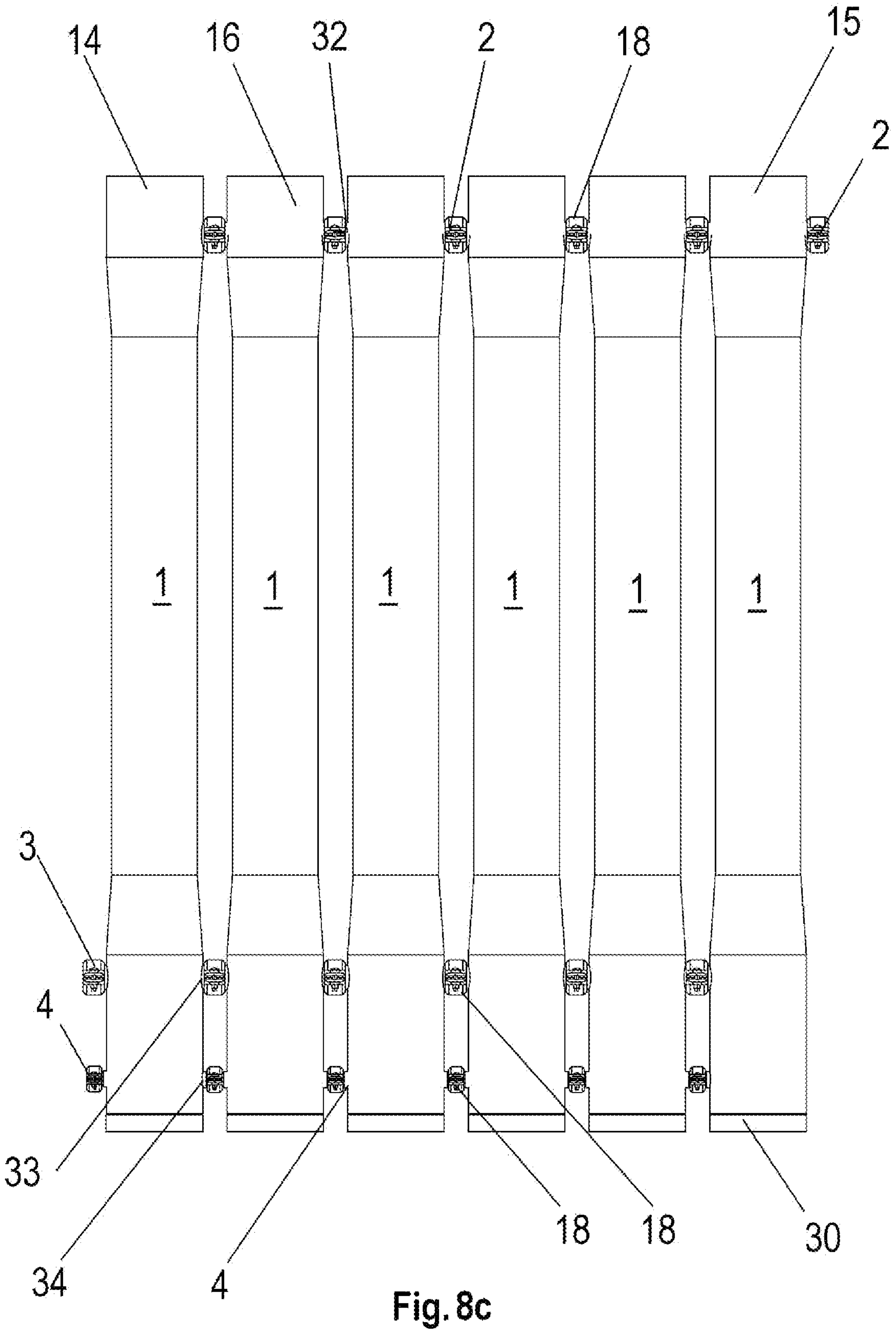

FIGS. 8*a*, 8*b* and 8*c* are schematic representations of the row of six pressure-vessels 1. The figs. Show different embodiments with slightly different outlet configurations. In FIG. 8*a* the pressure vessels include the four intermediate 6-port pressure-vessels 16, the 4-port end pressure-vessel 14 at the first-row end and the 5-port entry pressure-vessel 15 at the second row-end. The pressure-vessels 1 in one row are in liquid connection with each other with releasable liquid couplings 18 to allow flow of seawater, permeate (desalinated water) and brine (high salt concentration seawater) (in the case the pressure vessels are used for desalination) between the pressure-vessels 1 as well as joining the pressure-vessels mechanically, holding the pressure-vessels 1 in each row together. The ports are provided with the releasable liquid couplings 18 including at each of the feed liquid inlets 2, at the retentate outlets 3 and at the permeate/filtrate outlets 4. In addition to the three ports listed above, does the 4-port pressure-vessel 14 include a retentate inlet 33. In addition to the three ports listed above, does the 5-port pressure-vessel 15 include a feed liquid outlet 32 and a permeate inlet 34. In addition to the three ports listed above, does the 6-port pressure-vessel 16 include a retentate inlet 33, a feed liquid outlet 32, and a permeate inlet 34.

The releasable liquid couplings 18 may be formed as threaded connectors, as clamp connectors/connecting clamps. Suitable couplings may be sold as Victaulic couplings, where Victaulic is a trade name. The permeate end caps 30 are located at the bottom of each of the pressure-vessels 1.

The only difference between the six pressure-vessels 1 is the number of ports. All the pressure-vessels have the same dimensions.

FIG. 8*b* shows a different embodiment where the entry pressure vessel 15 include 6 ports and include a permeate/filtrate outlet 4, a retentate outlet 3, a permeate inlet 34 and a retentate inlet 33. The end pressure vessel 14 only includes 3 ports and thus no retentate inlets or permeate inlets.

FIG. 8*c* shows a different embodiment where the entry pressure vessel 15 includes 4 ports and include a feed liquid outlet 32, a permeate/filtrate outlet 4 and a retentate outlet 3 but no permeate inlet or retentate inlet. The end pressure vessel 14 includes 5 ports and thus includes both inlets and outlets for retentate and permeate. (permeate inlet and 34, retentate inlet 33)

Figure 9:
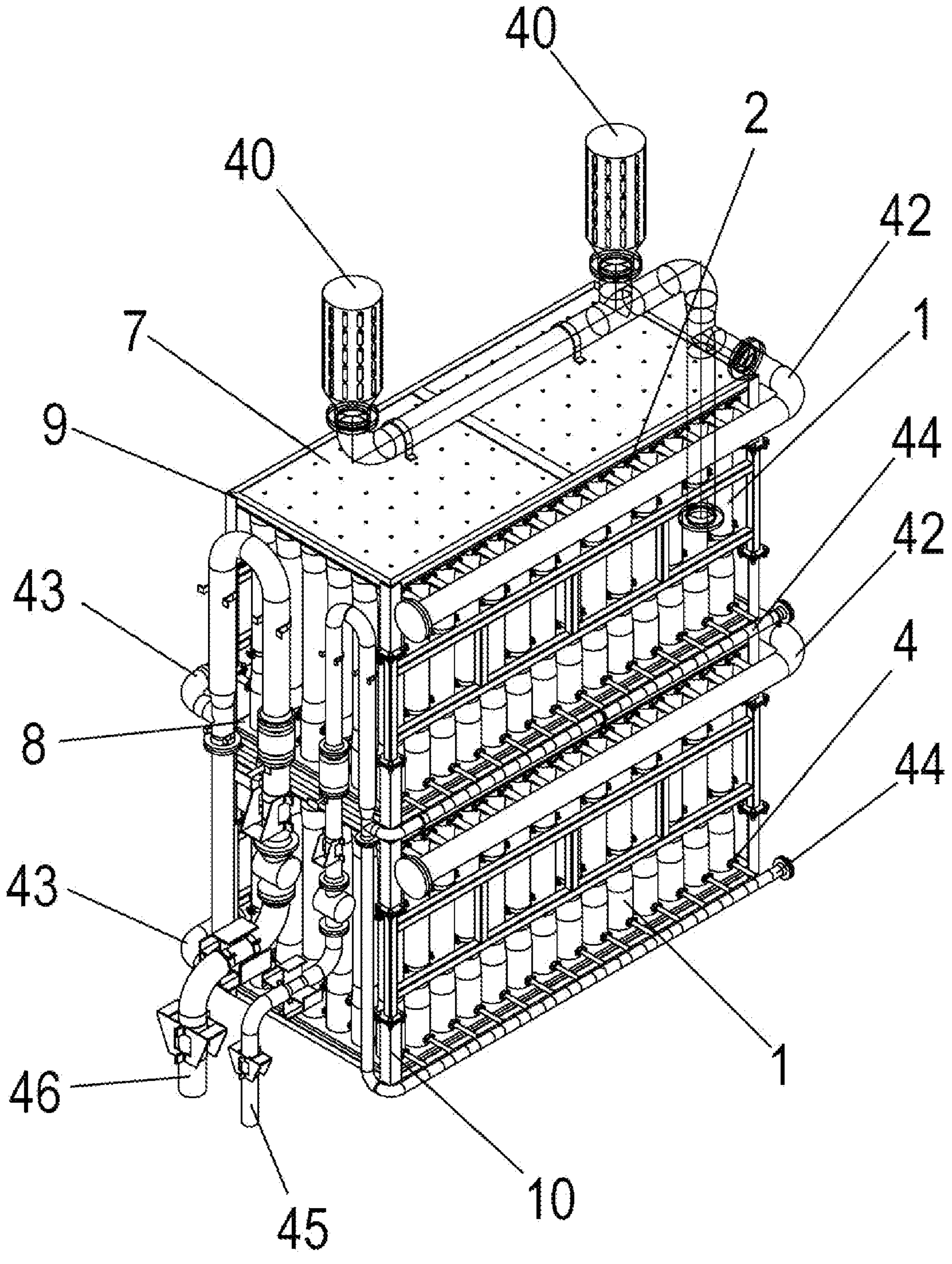
FIG. 9 is a perspective view of a subsea, retrievable filter-box module according to the invention with two filter-boxes as shown in FIG. 1.

FIG. 9 is a perspective view of a Filter-box module according to the invention with two Filter-boxes as shown in FIG. 1, one on top of the other (with 14 rows of pressure-vessels instead of 10). The pressure-vessels 1 are shown in 6 lines, each line with 14 pressure-vessels 1 to a total of 168 pressure-vessels 1. Each of the 14 rows of pressure-vessels 1 is fed with feed liquid through two inlet filters 40 in liquid connection with one feed liquid header 42 for each layer of filter-boxes. In FIG. 9, there are two layers of filter-boxes and thus two feed liquid headers 42. The feed liquid headers 42 include a plenum tube and one inlet tube in liquid connection with the feed liquid inlet 2 for each row of pressure-vessels.

Permeate from each of the ten rows of pressure-vessels 1 is led into one permeate header 44 for each layer of filter-boxes. In FIG. 9, there are two layers of filter-boxes and thus two permeate headers 44. The permeate headers 44 include a plenum tube and one outlet tube in liquid connection with the permeate/filtrate outlet 4 for each row of pressure-vessels.

Brine from each of the ten rows of pressure-vessels 1 is led into one retentate header 43 for each layer of filter-boxes. In FIG. 9, there are two layers of filter-boxes and thus two retentate headers 43. The retentate headers 43 include a plenum tube and one inlet tube in liquid connection with the retentate outlet for each row of pressure-vessels.

The pressure-vessels 1 are held in place between the first support plate/top support plate 7 and the second support plate/a bottom support plate 8. The top support plate 7 and the bottom support plate 8 are located in the upper frame portion 9 and the lower frame portion 10 of each filter-box respectively.

A permeate template connection 45 and a retentate template connection 46 are in liquid contact with the permeate header 44 and the retentate header 43 respectively. The template connections 45, 46 are connected to a desalination template when the filter-box module is installed on a subsea desalination template.

The embodiment presented in FIG. 9 will also be applicable for other systems where the feed sea water flow passing the sea water inlet filter 40 is filtered by any type of filter cartridges located inside the pressure-vessels 1 where the filtrate flow exits at template connection 45 and the retentate exits at outlet 46.

Figure 10:
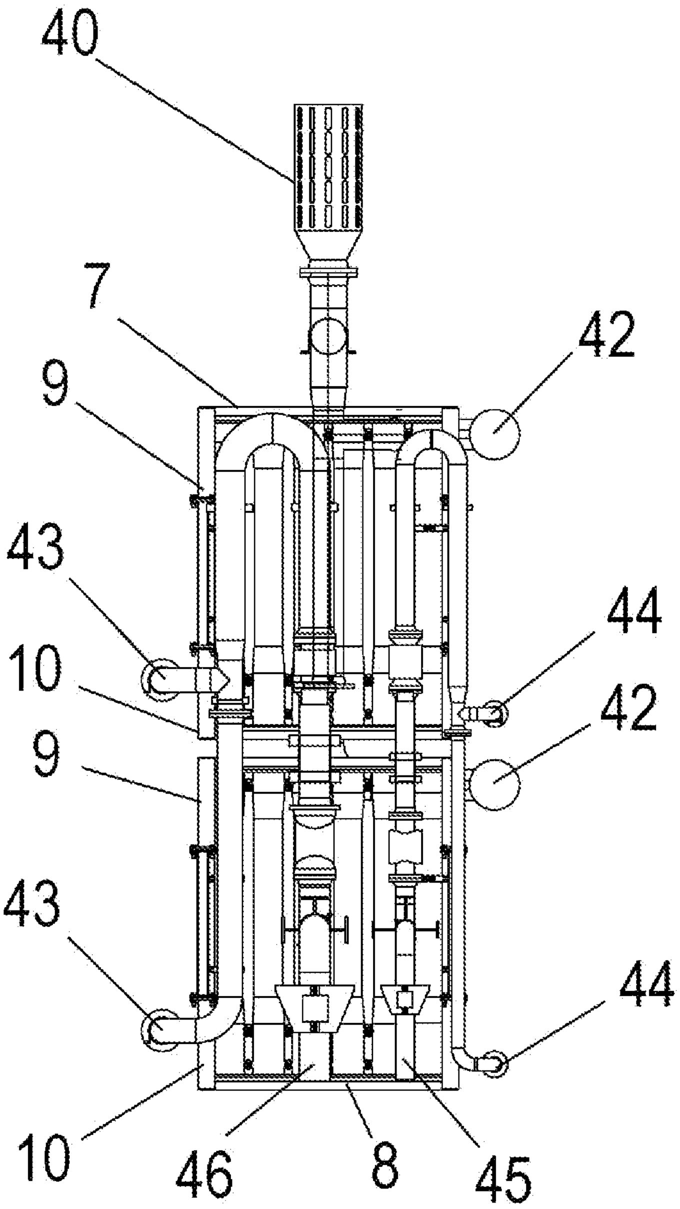
FIG. 10 is a side view of the retrievable filter-box module of FIG. 9 from a first side.
Figure 11:
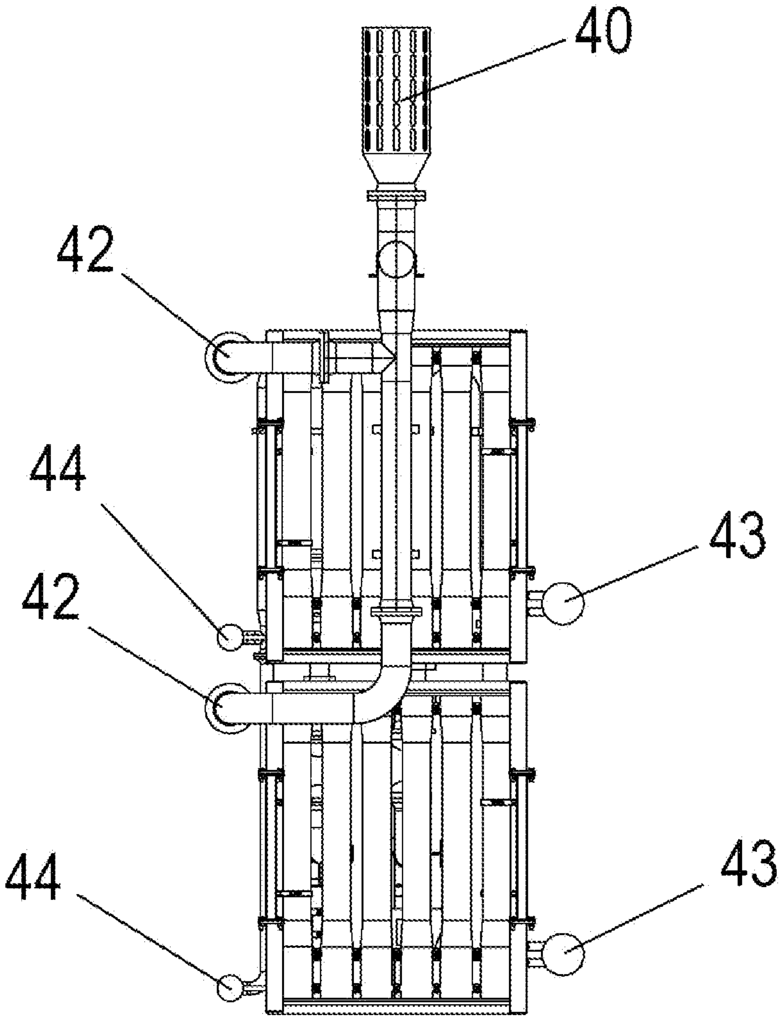
FIG. 11 is a side view of the retrievable filter-box module of FIG. 9 from a second side.

FIG. 10 is a side view of the filter-box module of FIG. 9 from a first side and FIG. 11 is a side view of the filter-box module of FIG. 9 from a second side. Each of the filter-boxes include the top plate 7, the top frame 9, the bottom plate 8 and the bottom frame 10. Valves and liquid parameter sensors are located in the flow path between the retentate headers 43 and the retentate template connection 46. Valves and liquid parameter sensors are located in the flow path between the permeate headers 44 and the permeate template connection 45. The sea water headers 42 are in liquid connection with the sea water inlet filters 40.

The liquid parameter sensors may include temperature sensors, salinity sensors, pressure sensors, mass flow sensors, contamination sensors etc.

Figure 12:
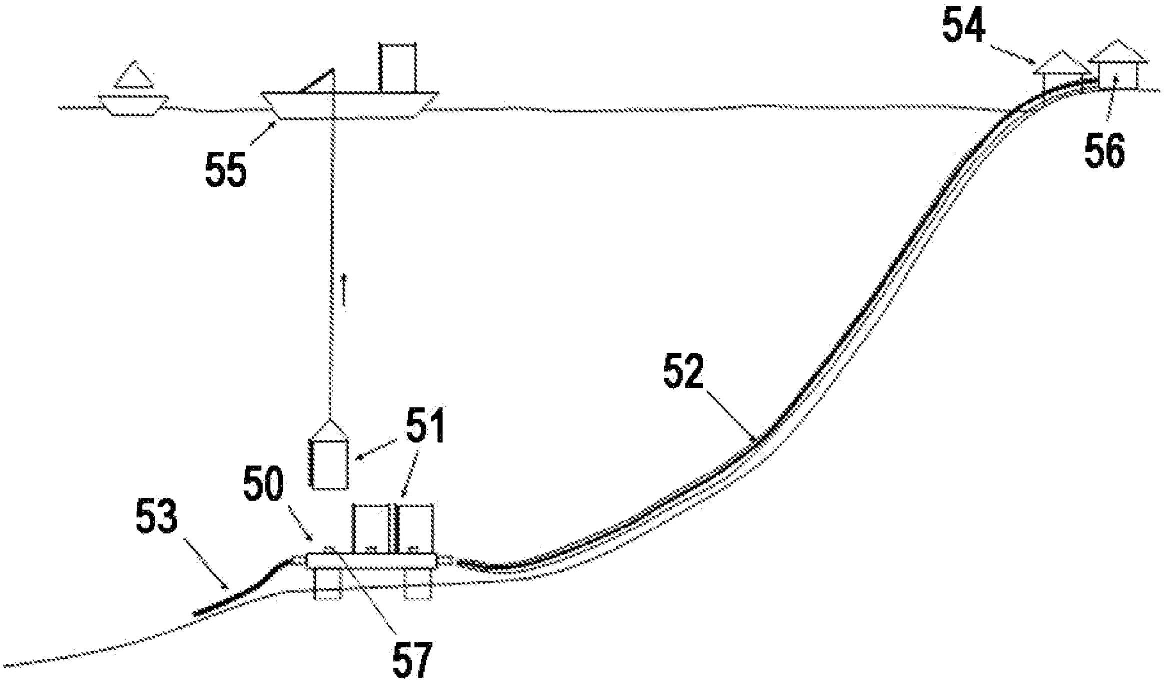
FIG. 12 is a schematic representation of a subsea desalination template with a retrievable filter-box module of the invention.

FIG. 12 is a schematic representation of a subsea desalination template 50 with retrievable filter modules 51 of the invention in retrievable subsea filter module zones 57. The filter modules 51 are launched or retrieved from the desalination template from a support/service vessel 55. A retentate outlet pipe 53 extends from the desalination module 50 and to a location away from a feed liquid inlet for the filter modules 51. Permeate and service lines 52 extend from the desalination template and to a permeate receiving facility 54. The permeate receiving facility 54. A control station 56 may be connected to the subsea desalination template 50 and may provide power and control to the subsea desalination template 50. The subsea desalination template 50 may form a part of a system with one or several circulation pumps for feed liquid for one or several transport pumps for permeate, with separate inlet filters, systems for monitoring the operation and so on.

The subsea template 50 may include dedicated sones for filter modules 51 of the invention and may include connections for at least one of a permeate inlet, a retentate inlet and a feed liquid outlet.

The pressure-vessels are RO-pressure-vessels for desalination of water. Other filtering pressure vessels may also be utilised in the invention.

The above description is made with RO membranes installed inside the pressure vessels for desalination purposes in mind. In other systems may however other types of membranes be installed and the wording may differ.

| | |
|---|---|
| 1 | pressure-vessel |
| 2 | feed liquid inlet |
| 3 | retentate outlet |
| 4 | permeate/filtrate outlet |
| 5 | pressure-vessel centre section |
| 6 | second end section |
| 7 | first support plate |
| 8 | second support plate |
| 9 | upper frame portion |
| 10 | lower frame portion |
| 11 | centre frame portion |
| 12 | frame joints |
| 13 | pressure-vessel support clamps |
| 14 | 4-port end pressure-vessel |
| 15 | 5-port entry pressure-vessel |
| 16 | 6-port intermediate pressure-vessel |
| 17 | first end section |
| 18 | releasable liquid coupling |
| 20 | fixing geometry/circular recesses |
| 21 | first end section end face |
| 22 | second end section end face |
| 23 | first end section side face |
| 24 | second end section side face |
| 25 | tool attachment portion |
| 30 | permeate end cap |
| 31 | permeate channel |
| 32 | feed liquid outlet |
| 33 | retentate inlet |
| 34 | permeate inlet |
| 35 | top plug |
| 36 | end cap attachment bracket |
| 37 | end cap seal |
| 38 | permeate/filtrate outlet tube |

-continued

| | |
|---|---|
| 40 | feed liquid inlet filter |
| 42 | feed liquid header |
| 43 | retentate header |
| 44 | permeate header |
| 45 | permeate template connection |
| 46 | retentate template connection |
| 50 | desalination template |
| 51 | filter module |
| 52 | permeate and service lines |
| 53 | retentate outlet pipe |
| 54 | permeate receiving facility |
| 55 | support vessel |
| 56 | control station |
| 57 | retrievable subsea filter module zone |

The invention claimed is:

1. A subsea filter-box with a plurality of longitudinal pressure-vessels forming at least one group of longitudinal pressure-vessels, wherein each pressure vessel includes a membrane, a first end section and a second end section;

wherein each first end section, includes a first side face and a first end section end face;

wherein each second end section, includes a second side face and a second end section end face;

wherein the first end section end face faces away from the second end section end face;

at least one feed liquid inlet on the first end section side face;

at least one retentate outlet and at least one permeate/filtrate outlet on the second end section side face;

the subsea filter-box comprising:

a first support plate with a plurality of fixing geometries, each supporting a first end section;

a second support plate with a plurality of fixing geometries, each supporting a second end section, whereby each of the plurality of pressure-vessels extends between a fixing geometry on the first support plate and a fixing geometry on the second support plate;

wherein the at least one group of pressure-vessels includes at least:

one entry pressure-vessel with at least one feed liquid outlet on the first end section side face;

at least one intermediate pressure-vessel with at least one feed liquid outlet on the first end section side face;

at least one permeate inlet on the second end section side face;

at least one retentate inlet on the second end section side face, adjoining and in liquid connection with the entry pressure-vessel;

one end pressure-vessel, adjoining and in liquid connection with an intermediate pressure-vessel; and a clamp structure, clamping the first support plate and the second support plate to the plurality of pressure-vessels.

2. The subsea filter-box of claim 1, wherein the entry pressure-vessel is a 5-port pressure-vessel, the end pressure-vessel is a 4-port pressure-vessel and the at least one intermediate pressure-vessel is a 6-port pressure-vessel.

3. The subsea filter-box of claim 2, wherein the entry pressure-vessel furthermore includes a permeate/filtrate inlet on the second end section side face, and the end pressure-vessel includes a retentate inlet on the second end section side face.

4. The subsea filter-box of claim 1, wherein the feed liquid inlet, the retentate outlet, and the permeate/filtrate outlet of a pressure vessel is fixed to the feed liquid outlet, the retentate inlet and the permeate inlet respectively of a neighbouring pressure vessel with releasable liquid couplings.

5. The subsea filter-box of claim 1, wherein the releasable liquid couplings provides mechanical joints providing a stiff connection, mechanically fixing the pressure-vessels in a group of longitudinal pressure-vessels to each other.

6. The subsea filter-box of claim 1, wherein each pressure vessel includes a permeate end cap sealing a permeate side of the pressure-vessel, the permeate end cap including a permeate channel fixed to a threaded portion of a permeate/filtrate outlet tube of the pressure-vessel with an end cap attachment bracket formed as a tube with internal threads threaded onto the permeate/filtrate outlet tube, and with ports on the side to allow the permeate to flow out of the tube, holding the end cap to the permeate/filtrate outlet tube.

7. The subsea filter-box of claim 1, wherein the first end section end face is parallel to the second end section end face.

8. The subsea filter-box of claim 1 wherein the membrane is a Reverse Osmosis (RO) membrane and wherein the subsea filter-box is adapted to be used for subsea desalination whereby the feed liquid is seawater, the retentate is brine and the permeate is freshwater.

9. A retrievable subsea filter module with at least one subsea filter-box of claim 1, including a plurality of groups of longitudinal pressure-vessels further including:

a liquid inlet header in liquid connection with each liquid inlet on each entry pressure vessel;

a retentate header in liquid connection with each retentate outlet on one of each entry pressure vessel or each end pressure-vessel; and a permeate header in liquid connection with each permeate/filtrate outlet on one of each entry pressure vessel or each end pressure-vessel.

10. The retrievable subsea filter module of claim 9, including two subsea filter-boxes wherein a first of the two subsea filter-boxes is located on top of a second of the two subsea filter-boxes, whereby a longitudinal centreline of each pressure vessel of the first subsea filter-box is coinciding with a longitudinal centreline of a pressure vessel of the second subsea filter-box.

11. A subsea desalination template with a retrievable subsea filter module of claim 9 in a dedicated retrievable subsea filter module zone;

a retentate outlet pipe extending from the desalination module; and a permeate and service line extending from the desalination template and to a permeate receiving facility.

* * * * *